United States Patent

[11] 3,580,403

| [72] | Inventor | Thomas Lancashire<br>West Chester, Pa. |
|---|---|---|
| [21] | Appl. No. | 771,955 |
| [22] | Filed | Oct. 30, 1968 |
| [45] | Patented | May 25, 1971 |
| [73] | Assignee | The Boeing Company<br>Seattle, Wash. |

[54] MATERIALS HANDLING APPARATUS
8 Claims, 7 Drawing Figs.

[52] U.S. Cl. ..................................................... 214/38,
108/53, 280/79.3, 294/67
[51] Int. Cl. ..................................................... B66c 1/00,
B64c 1/22
[50] Field of Search............................................ 214/16 (B),
16.4, 10.5, 620, 38.46; 294/67, 67.1, 67.1 (A);
280/79.2, 79.3; 108/53; 211/49, 60

[56] References Cited
UNITED STATES PATENTS

| 3,495,725 | 2/1970 | Tyndall et al. ................. | 214/16.4X |
| 2,896,799 | 7/1959 | McIntosh et al. ............... | 214/10.5 |
| 3,058,603 | 10/1962 | Tantlinger et al. ............. | 214/38(.42) |

FOREIGN PATENTS

| 1,005,807 | 9/1965 | Great Britain................. | 214/16(.4) |
| 193,368 | 12/1964 | Sweden ......................... | 294/67(.1A) |

Primary Examiner—Robert G. Sheridan
Attorneys—Robert J. McDonnell and Albert W. Hilburger ABSTRACT: Materials handling apparatus for integrating a plurality of individual loads. A supporting structure includes a plurality of fingers which extend transversely in opposite directions from an elongated beam at spaced locations along the beam. Positioned in a substantially horizontal plane, the fingers are adapted to support individual loads such that they can be raised as a unit upon elevation of the structure. A cradle is provided for moving the supporting structure across a surface and, in a modified embodiment, the fingers can be folded to a retracted position for storage.

INVENTOR:
THOMAS LANCASHIRE,
BY Albert S. Hilburger
ATTORNEY

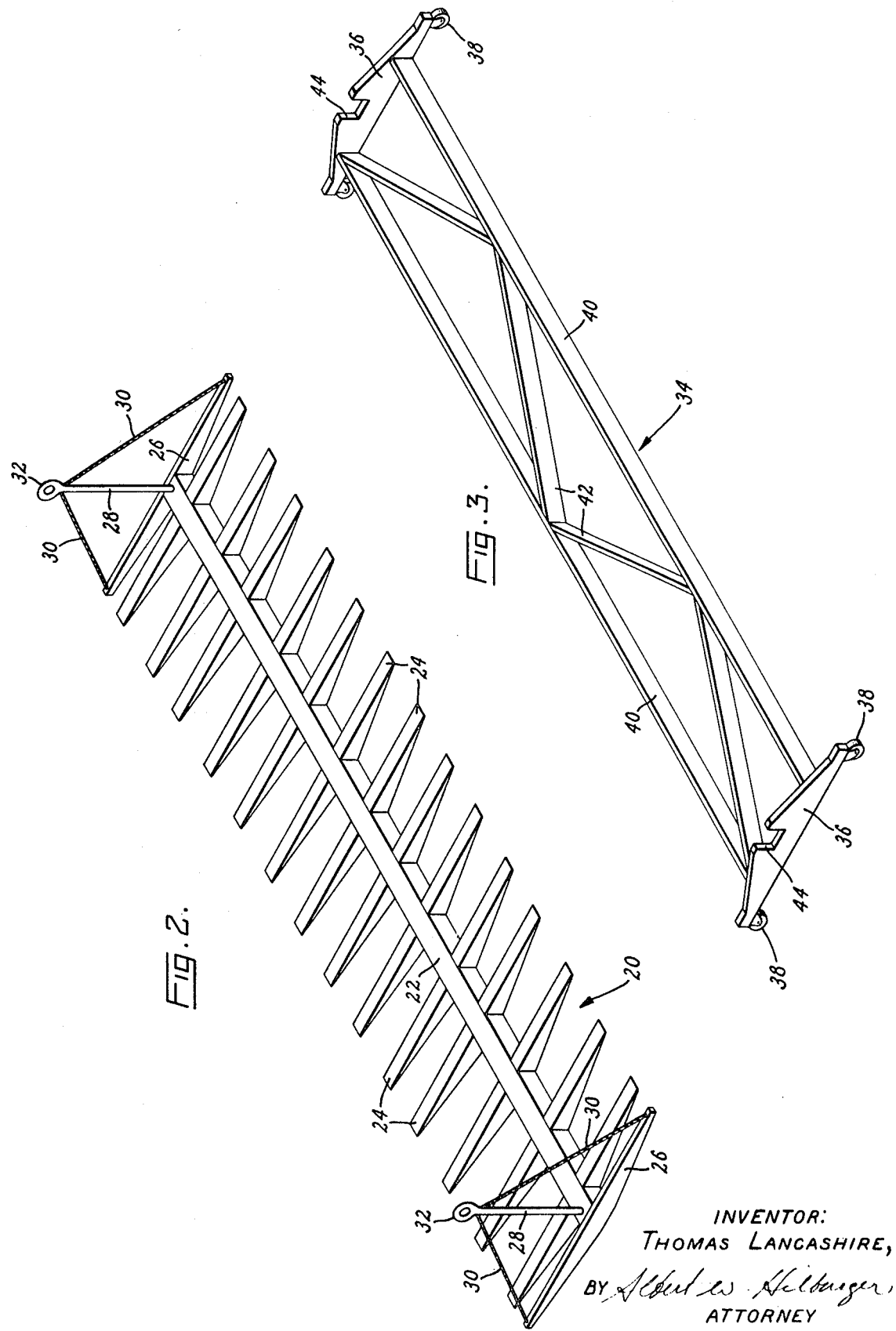

PATENTED MAY 25 1971 3,580,403

INVENTOR:
THOMAS LANCASHIRE,
BY Albert W. Hilburger
ATTORNEY

MATERIALS HANDLING APPARATUS

The present invention relates generally to materials handling apparatus and specifically to improved apparatus of this type which provides for integrating a plurality of individual loads.

In materials handling operations, it often occurs that equipment employed for transporting materials from one location to another is capable of carrying a payload equal in weight to a plurality of individual loads. However, if the individual loads cannot, in one fashion or another, be joined together or integrated so as to be transported as a unit, it may result that the equipment is restricted to transporting the individual loads one by one. This, of course, results in an inefficient use of the equipment and substantially increases the period of time and expense required to perform a particular operation.

Recent advances in equipment capable of transporting heavy payloads has increased the requirement for integrating individual loads. For example, it is possible, with the advent of heavy-lift helicopters, to lift between the shore and a cargo ship payloads which are heavier than the capacity of most conventional stevedore cranes. A heavy-lift helicopter can outperform a number of cranes during a given period of time and can do so while the ship is located at a distance from the shore. Thus, helicopters can offer the added benefits of freeing valuable wharf space for other purposes as well as servicing ships having drafts too deep to enter a harbor.

In the past, efforts have been made to integrate individual loads so that the maximum efficiency of conventional materials handling equipment can be achieved. As an example, partially or fully enclosed containers adapted to retain a plurality of individual articles are currently being employed. While such containers have proved to be successful in use, it has been found that a payload penalty results when they are used to accommodate palletized loads. That is, in such instances, the payload must include the weight of both the pallets and the containers, thus reducing the amount of the payload devoted strictly to the load being transported.

The invention is an improvement over these previous efforts in that it serves to integrate a plurality of individual loads for materials handling purposes while avoiding the drawbacks of known apparatus or procedures. Features of the invention include its light weight, its negligible volume as compared with the loads to be transported, its economical construction and low cost of upkeep, and its ability to be readily folded for storage. To these ends, the invention provides a supporting structure which includes a plurality of fingers extending transversely in opposite directions from an elongated beam at spaced locations along the beam. Positioned in a substantially horizontal plane, the fingers are adapted to support individual loads such that they can be raised as a unit upon elevation of the structure. A cradle is provided for moving the supporting structure across a surface and, in a modified embodiment, the fingers can be folded to a retracted position for storage.

Accordingly, it is an object of the invention to provide new and improved materials handling apparatus.

Another object of the invention is to provide new and improved materials handling apparatus for integrating a plurality of individual loads.

A further object of the invention is to provide new and improved materials handling apparatus which is light in weight and adds a minimum of volume to loads being carried. A related object is the provision of such a structure which can be mounted on a cradle for movement across a surface. Another related object is the provision of such a structure which can be folded for storage.

Still another object of the invention is to provide materials handling apparatus having a structure which includes a first support member and second support members extending transversely in opposite directions from the first support member and positioned in a substantially horizontal plane and adapted to support a plurality of individual articles. A related object is the provision of a cradle releasably supporting the structure for movement across the surface. Another related object of the invention is to provide such apparatus in which the second support members are pivotally mounted on the first support member for movement between an extended operating position and a retracted position for storage.

Other and further objects and advantages of the invention are obvious or will be made apparent in the description which follows, taken together with the accompanying drawings.

In the drawings, in which like numerals refer to like parts throughout:

FIG. 2 is a perspective view illustrating in greater detail a supporting structure shown in FIG. 1;

FIG. 3 is a perspective view illustrating in greater detail a cradle for the supporting structure shown in FIG. 2;

Figure 1:
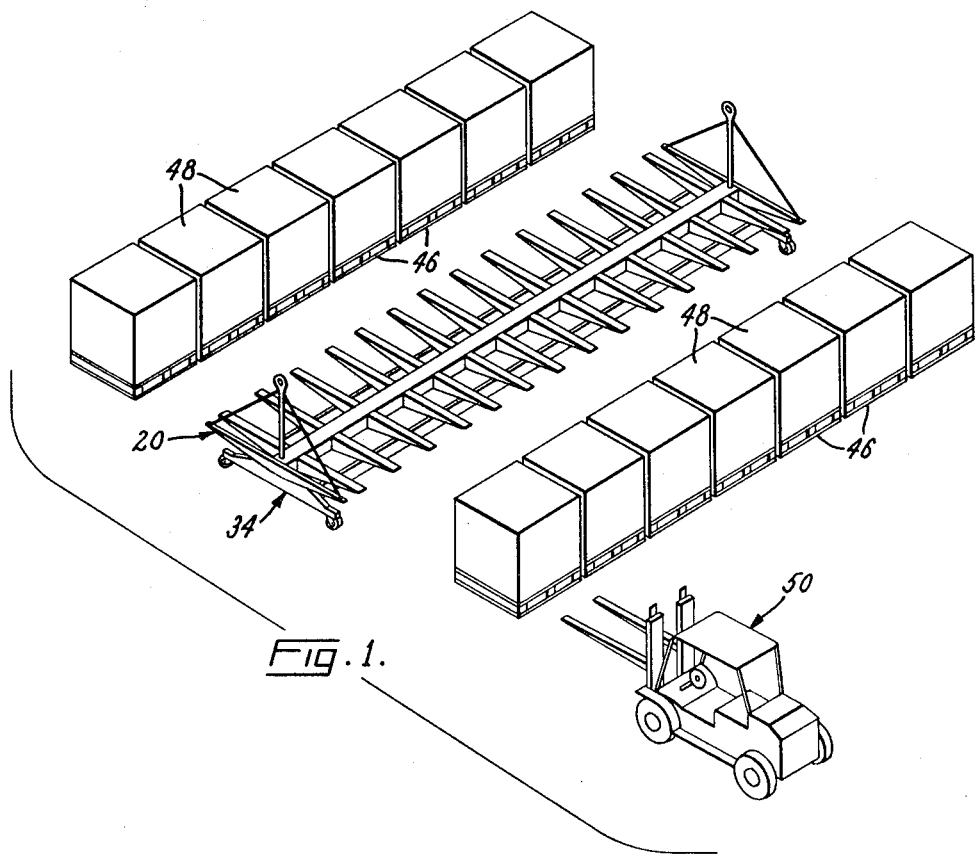
FIG. 1 is a perspective view of a materials handling system which embodies the present invention.

Refer now to the drawings and initially to FIG. 1 in which there is illustrated a supporting structure 20 which embodies the present invention. The structure 20 (FIGS. 1 and 2) includes a first supporting member in the form of an elongated beam 22 and a plurality of second support members or fingers 24 mounted on the beam which extend transversely in opposite directions from the beam at spaced locations along its length. Each finger 24 is tapered from a relatively heavy root section adjacent the beam 22 to a substantially thinner section adjacent its outermost end or tip. Although the finers 24 lie substantially in a horizontal plane, their upper surfaces may be slightly inclined so as to be elevated at their tips as compared with their root sections.

A pair of outriggers 26 are fixed adjacent extreme opposite ends of the beam 22 and extend outwardly from the beam in substantially the same manner and positioned in substantially the same plane as the fingers 24. Also mounted adjacent each end of the beam 22 is a suspension member or hanger 28 which is suitably fixed to and extends upwardly from the beam 22. A pair of stabilizer elements 30 are employed at each end of the structure 20 to impart a degree of rigidity to the structure. In the form of rods or cables, or the like, each of the stabilizer elements 30 has one of its ends fastened to an eye 32 at the uppermost part of the hanger 28 and its other end to an outer extremity of its associated outrigger 26.

A cradle 34 (FIGS. 1 and 3) serves to support the structure 20 when loading or unloading the structure, when moving the structure from one location to another, and possibly when storing the structure. A pair of crossbeams 36 define the opposite ends of the cradle 34 and are suitably supported on casters 38 or the like to provide mobility to the cradle 34. Connecting the crossbeams 36 are a pair of spaced parallel longerons 40, and rigidity is imparted to the cradle 34 by means of trusses indicated at 42. A notch 44 in the upper surface of each of the crossbeams 36 is of a size adapted to receive end portions of the elongated beam 22 between the outriggers 26 at the extreme ends of the beam and the first set of fingers 24 suitably spaced from the outriggers 26. By reason of the taper in each of the fingers 24, there is sufficient spacing between the fingers and the longerons 40 when the structure 20 is supported on the cradle 34 to assure that pallets 46 are slidable on the fingers 24.

Figure 4:
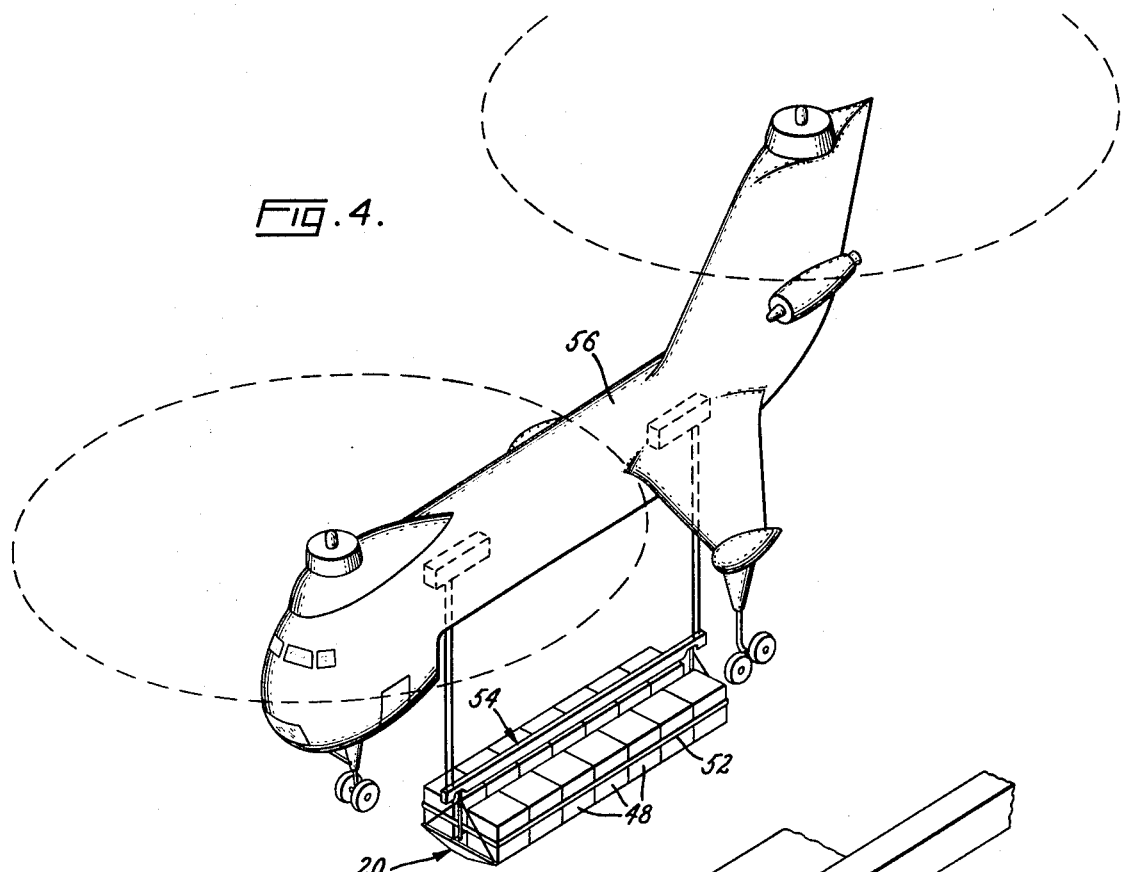
FIG. 4 is a perspective view illustrating an integrated payload utilizing the invention and being lifted by a helicopter.

The pallets 46 may be of a standard commercial or military size and type adapted to support loads 48 in storage and for transport. With the structure 20 resting on the cradle 34, a forklift truck 50 or other suitable apparatus can be employed to lift each pallet 46 with its associated load 48 and convey it to the structure 20 such that a pair of the fingers 24 will receivably engage the pallet 46. The spacing between the fingers 24 is such that, except for sufficient clearance to permit a pallet 46 to be slid along the fingers 46 when mounting the pallet onto the structure 20, each pallet is substantially prevented from further lateral movement on the fingers. It is also desirable to prevent further movement of the pallets 46 along the fingers 24, that is, in a lateral direction relative to the beam 22. This is partially achieved by means of the previously mentioned incline of the fingers 24 but can be achieved to an even greater extent by encircling the loads 48 by one or more restraining members, such as suitable straps 52 (FIG. 4), when all of the pallets 46 have been mounted on the supporting structure 20.

It will be appreciated that the weight of the loads 48 on one side of the supporting structure 20 should be substantially equal to their weight on the other side of the structure to assure that moments about a longitudinal axis of the beam 22 causing torsion in the beam are essentially cancelled out, that is, equal to zero. Thus, by utilizing the loads 48 themselves to offset one another, it is unnecessary to strengthen the structure 20 or otherwise adapt it to withstand or react against a tendency of the structure to rotate about the longitudinal axis of the beam 22. Rather, it is only necessary to provide sufficient strength to support the cantilevered weight of the loads 48 mounted on the beam 22. In this manner, the structure 20 have a minimum of weight and volume while supporting the heaviest payload possible.

Thus, a plurality of individual loads 48 resting on pallets 46 have, by reason of the supporting structure 20, been integrated into a unit which is thereupon readily movable between a common carried such as a ship and the shore. For example, a suitable hoist system 54 (FIG. 4) of a helicopter 56 can engage the eyes 32 of the hangers 28 and convey the integrated payload to and from a ship which may be located at some distance from the shore. When the integrated payload reaches the ship, the supporting structure 20 may be placed upon another suitable cradle 34 for the duration of the journey allowing ease of handling aboard ship. Of course, the individual pallets 46 may be removed from the structure 20 should that be desired. Similar treatment can be afforded a payload which has been transferred to shore.

Figure 5:
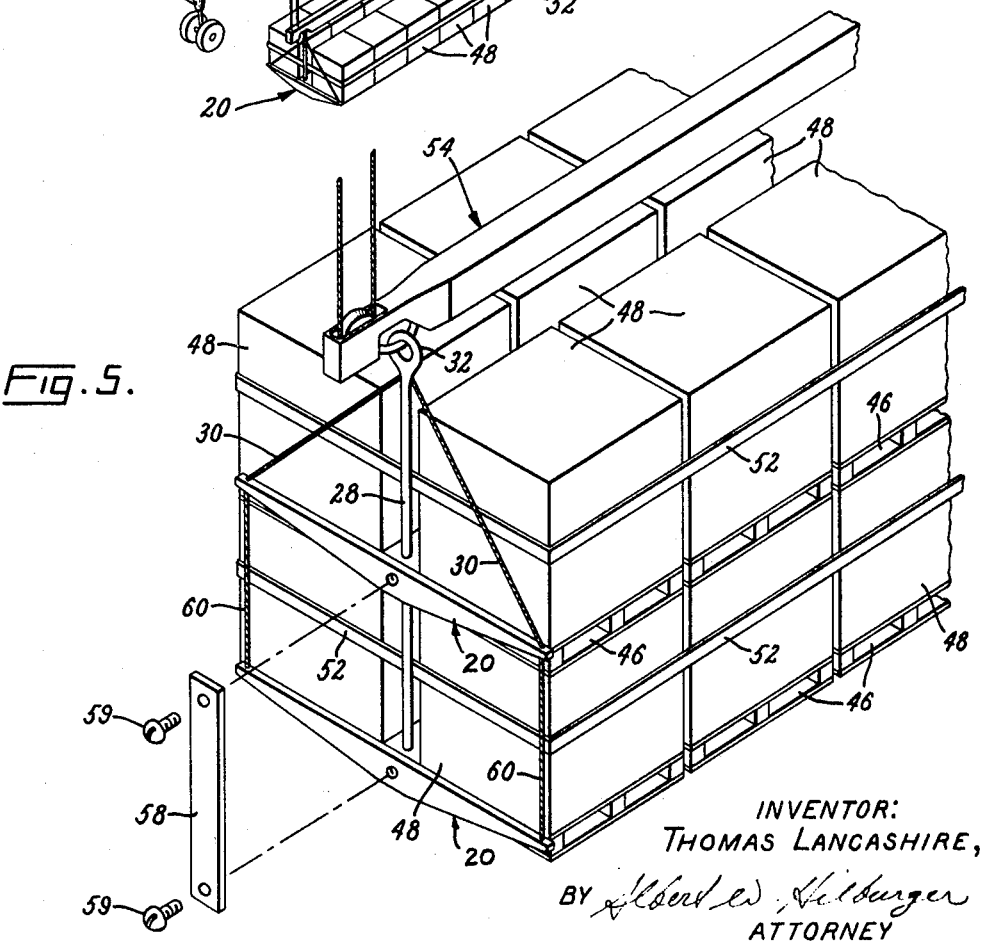
FIg. 5 is a partial perspective view, partly exploded, illustrating a modified embodiment of the invention which provides for an increased payload.

For maximum utilization of the helicopter 56, it may be desirable to provide a suitable load bearing strut 58 (FIG. 5) which can be releasably mounted, as by suitable fasteners 59, to the ends of each of the beams 22 of a pair of structures 20 such that one structure is positioned substantially above the other structure. A double-deck arrangement is thereby achieved and further rigidity can be provided for the arrangement by means of auxiliary struts 60 suitably interconnecting the extremities of the outriggers 26 of the upper structure 20 with those of the lower structure 20.

Figure 6:
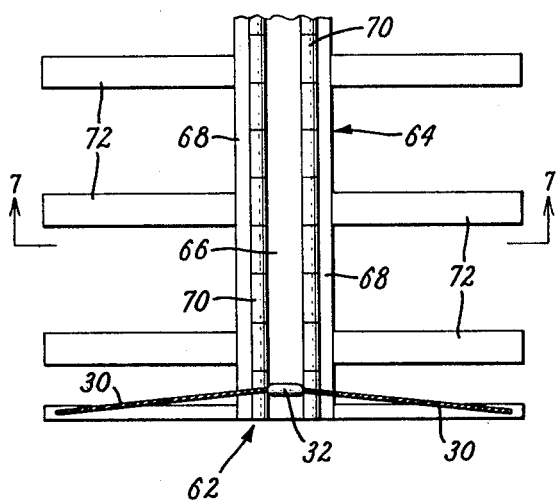
FIG. 6 is a partial top plan view of another modified embodiment of the invention; and FOG. 7 is a section view taken along line 7-7 in FIG. 6 but illustrating with solid lines the supporting structure in a retracted position for storage and with dotted lines the supporting structure in an extended position for use.
Figure 7:
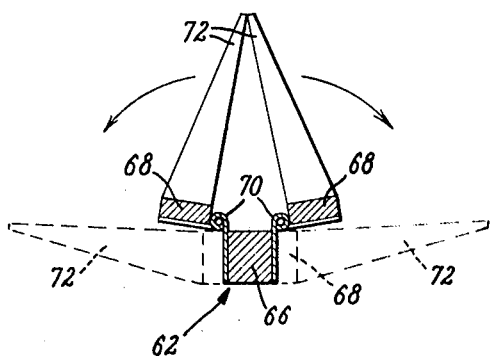

Another embodiment of the invention is illustrated in FIGS. 6 and 7 which illustrate a modified supporting structure 62 in which a first support member in the form of an elongated beam 64 includes a central portion 66 and a pair of associated portions 68 at either side of the central portion 66 and pivotally connected to the central portion by means of hinges 70. As in the embodiment illustrated in Fig. 1, a plurality of fingers 72 extend transversely in opposite directions from each of the associated portions 68 at spaced longitudinal locations. When the supporting structure 20 is in operation, the fingers 72 are positioned in a substantially horizontal plane, as seen in dotted lines in FIG. 7, such that they are adapted to engage and support the pallets 46 in the manner described above. However, for storage of the supporting structure 62, the fingers 72 fixed to the associated portions 68 can be pivoted on the hinges 70 until they assume the solid line positions indicated in FIG. 7. Subsequently, by reversing this procedure, the fingers 72 can be readily returned to their operative positions.

Thus, apparatus has been disclosed which satisfies the aforesaid objects. By reason of the invention, it is possible to transport rapidly and economically a large number of individual loads by integrating them into a single large payload prior to arrival of the helicopter 56 or other lifting apparatus. At the same time, the structure 20 permits flexibility of operation in that it can be readily loaded and unloaded, moved along a surface on the cradle 34, and folded for storage according to the embodiment illustrated in FIGS. 6 and 7. Furthermore, the structure 20 is light in weight, adds a minimum of volume to the loads 48 being supported, and has a low initial cost as well as cost of upkeep.

It is to be understood that although the invention has been described with reference to particular preferred embodiments and for ease of description has been described with reference to certain constructional details, the invention is not limited in its application or construction to the precise examples shown. Rather, such embodiments of the invention as come within the scope and purview of the appended claims are to be considered as part of this invention.

I claim:

1. A materials handling apparatus comprising in combination:

a structure including first support means comprising an elongated beam, second support means comprising an elongated beam, second support means comprising a plurality of fingers mounted on said beam and extending transversely in opposite directions therefrom, said fingers being positioned in a substantially horizontal plane and adapted to support individual loads separately such that the individual loads separately such that the individual loads can be raised as a unit upon elevation of said structure, and a cradle adapted to support said structure for movement of said structure across a surface, said cradle comprising a pair of crossbeams jointed by a pair of longerons and having means to receive and hold said structure in place.

2. The materials handling apparatus of claim 1, wherein said plurality of fingers are tapered from a relatively heavy root section adjacent said beam to a thinner section at their outermost tips and being adapted to handle individual palletized loads.

3. The materials handling apparatus of claim 1, wherein said means to receive and hold said support in place on said cradle comprises a cutout portion in each of said crossbeams of said cradle.

4. A materials handling apparatus comprising in combination:

a structure including a beam having a longitudinal axis and a plurality of fingers mounted on said beam and extending substantially perpendicular thereto in opposite directions at spaced locations therealong, said fingers being positioned in a substantially horizontal plane, a plurality of individual pallets engageably received for support on said fingers on both sides of said beam so that moments about said longitudinal axis are substantially zero, enabling said individual pallets to be raised as a unit upon elevation of said structure, and a cradle adapted to support said structure for movement across a surface and comprising a pair of crossbeams joined by a pair of longerons, each cross beam having a cutout portion to receive said beam and hold it in place.

5. The materials handling system of claim 4, wherein said fingers are tapered from a relatively heavy root section adjacent said beam to a thinner section at their outermost tips.

6. A materials handling apparatus for integrating a plurality of individual loads into a single payload comprising a supporting structure including a pair of spaced beams and a plurality of fingers mounted on each of said beams and extending transversely in opposite directions at spaced locations thereon, said fingers being positioned in a substantially horizontal plane and adapted to support the individual loads separately, means for removably interconnecting said beams and holding said beams a predetermined distance apart such that one of said beams is an upper beam and the other is a lower beam, and suspension means mounted on said supporting structure such that the individual loads in a stacked relationship can be raised as a unit upon elevation of said supporting structure.

7. The materials handling apparatus of claim 6, wherein said fingers are tapered from a relatively heavy root section adjacent their respective beam to a thinner section at their outermost tips and being adapted to support individual palletized loads.

8. Materials handling apparatus of claim 6, including a cradle adapted to support said stacked beams and comprising a pair of crossbeams joined by a pair of longerons wherein each crossbeam has a cutout portion to receive said lower beam and hold it in place on said cradle.

UNITED STATES PATENT OFFICE
CERTIFICATE OF CORRECTION

Patent No. 3,580,403     Dated May 25, 1971

Inventor(s) T. Lancashire

It is certified that error appears in the above-identified patent and that said Letters Patent are hereby corrected as shown below:

In Claim 1, Column 4 beginning on line 23 delete "an elongated beam, second support means comprising" ending on line 24.

In Claim 1, Column 4 beginning on line 29 delete "separately such that the individual loads" ending on line 30.

Signed and sealed this 17th day of October 1972.

(SEAL)
Attest:

EDWARD M. FLETCHER, JR.
Attesting Officer

ROBERT GOTTSCHALK
Commissioner of Patents